Patented July 30, 1929.

1,722,710

UNITED STATES PATENT OFFICE.

LORE A. ROGERS, OF WASHINGTON, DISTRICT OF COLUMBIA, ASSIGNOR TO THE GOVERNMENT AND THE PEOPLE OF THE UNITED STATES OF AMERICA.

PROCESS OF PREPARING MILK FOR INFANT FEEDING.

No Drawing.   Application filed March 15, 1928. Serial No. 262,023.

(GRANTED UNDER THE ACT OF MARCH 3, 1883, 22 STAT. L., 625.)

This application is made under the act of March 3, 1883, chapter 143 (22 Stat. 625) and the invention herein described if patented may be used by the Government of the United States or any of its officers or employees in the prosecution of work for the Government, or by any other person in the United States, without payment to me of any royalty thereon.

It is now a common practice in preparing milk for infant feeding to render it acid either by adding lactic acid, lemon juice or other acids, or by developing acid by growing in it lactose fermenting bacteria. This is an expensive and time-consuming process and under domestic conditions is likely to result in a lack of uniformity.

I have devised a process by which a sour milk may be prepared on a large scale and preserved without sterilization in suitable containers for use at any time. For this process cow's milk may be used in its natural condition, or its composition may be modified to make it correspond more closely to human milk and consequently more suitable for infant feeding. To do this it is customary to remove some of the fat and to add lactose or other carbohydrate.

The milk, in its natural state or after modification, is pasteurized according to the usual commercial practice by heating to 145° F. and holding at this temperature for 30 minutes. This is done to destroy the enzymes of the milk and any pathogenic bacteria which may be present. After pasteurization the milk is homogenized without previous cooling. This is done to prevent separation of the fat on standing. It is then cooled to a suitable temperature for the growth of the acidifying bacteria and inoculated with a suitable culture. Bacteria of the lactobacillus group are essential for this purpose, and a temperature of 40° to 45° C. is necessary to secure the desired acidity in a reasonable time. The acidity required in the milk depends on the degree to which the milk is concentrated in the vacuum pan, but it must be high enough to insure an acidity in the finished product equivalent to a hydrogen-ion concentration of $p^H$ 3.4 or lower. If the concentration of the milk is to be about 2 to 1 the acidity of the milk should be not less than 1.8 per cent lactic acid. In place of the fermentation this degree of acidity may be obtained by the addition of lactic acid, lemon juice, or other acids. With this high acid the milk may be concentrated in a vacuum pan to the required degree.

Since the milk is not sterilized it must contain sufficient acid to prevent the growth of bacteria and yeasts. In this condition the milk may be kept indefinitely if it is sealed in air-tight containers to prevent the growth of molds.

On diluting with the proper amount of water it is in good condition for feeding. Its advantages are that it can be prepared in large quantities, thus securing uniformity and economy of production; it is not necessary to heat the milk above ordinary pasteurizing temperature; and the milk can be made available in convenient packages in any part of the world.

A typical example of my process is as follows: I took 77 pounds of fresh cow's milk containing,—

| | Per cent. |
|---|---|
| Fat | 4.2 |
| Protein | 4.0 |
| Lactose | 4.7 |
| Ash | 0.7 |

To this was added 6.0 pounds of lactose and 2.2 pounds of fat in the form of cream.

This was pasteurized by heating in a jacketed vat to 62.5° C. and holding at this temperature for 30 minutes. Without cooling the milk was homogenized at 2800 pounds pressure, cooled to 42.5° C. and inoculated by adding 1½ quarts of a milk culture of the lactobacillus type.

The milk was held for 48 hours at 42° C. At the end of this period the milk had an acidity of 1.92 per cent calculated as lactic acid. The curd was broken up by agitation and the milk drawn into a vacuum pan without forewarming. Water was evaporated under a vacuum of 28 inches until a concentration of 37.5 per cent total solids was reached. It was drawn from the pan and, while still warm, was sealed in sanitary cans.

The composition of the concentrated milk was:

| | Per cent. |
|---|---|
| Fat | 11.1 |
| Lactose | 18.9 |
| Protein | 6.6 |
| Ash | 0.9 |
| Water | 62.5 |

When diluted with two parts of water to one of milk this has a composition approximating that of human milk and a hydrogen-ion concentration of $p^H$ 3.42.

I claim:

1. A process for preparing milk for infant feeding, comprising pasteurizing the milk by heating the same at a temperature of about 62.5° C. for a period of approximately thirty minutes, homogenizing the heated milk at a pressure of about 2800 pounds, then cooling the milk to a temperature of about 42.5° C., subsequently inoculating the milk with a milk culture of the lactobacillus group and maintaining the inoculated milk at a temperature of about 42° C. for a period of time, approximately 48 hours, sufficient to develop a hydrogen-ion concentration of about $p^H$ 3.5 to prevent the growth of bacteria and yeasts in said milk.

2. A milk adapted for infant feeding containing fat 11.1 per cent; lactose 18.9 per cent; protein 6.6 per cent; ash 0.9 per cent; and water 62.5 per cent, the acid content of said milk being equivalent to a hydrogen-ion concentration of approximately $p^H$ 3.5.

LORE A. ROGERS.